United States Patent [19]

McAdams, Jr.

[11] Patent Number: 4,783,598

[45] Date of Patent: Nov. 8, 1988

[54] OPTICALLY COUPLED INTERFACE FOR PORTABLE SEMI-CONDUCTOR DATA MEDIA

[75] Inventor: Charles K. McAdams, Jr., Raleigh, N.C.

[73] Assignee: Teles Computer Products, Inc., Tulsa, Okla.

[21] Appl. No.: 905,552

[22] Filed: Sep. 10, 1986

[51] Int. Cl.⁴ .............................................. B42D 15/00
[52] U.S. Cl. ..................................... 250/566; 283/85; 350/331 R; 235/454
[58] Field of Search ............... 250/566, 568, 569, 229, 250/231 R, 555, 271; 350/331 R; 283/904, 85; 235/454, 455

[56] References Cited

U.S. PATENT DOCUMENTS

| | | | |
|---|---|---|---|
| 4,204,116 | 5/1980 | Cresswell et al. | 250/229 |
| 4,205,225 | 5/1980 | LeGoff | 250/229 |
| 4,472,627 | 9/1984 | Weinberger | 283/904 |
| 4,536,014 | 8/1985 | Boutaleb et al. | 350/331 R |
| 4,587,413 | 5/1986 | Hoppe et al. | 283/904 |

FOREIGN PATENT DOCUMENTS 2028555  3/1980  United Kingdom ................ 283/85

*Primary Examiner*—Edward P. Westin
*Assistant Examiner*—Charles F. Wieland
*Attorney, Agent, or Firm*—Head & Johnson

[57] ABSTRACT

An optically coupled data interface formed of a host device having apparatus to receive data in optical format, the host device having apparatus to impart optical data initiating signals, a portable module adaptable to interface with the host device and having an optically responsive window adapted to receive optical data initiating signals from the host device and means self-contained in the portable module controlling the optically responsive window to impart data onto optical signals receivable by the host device.

7 Claims, 1 Drawing Sheet

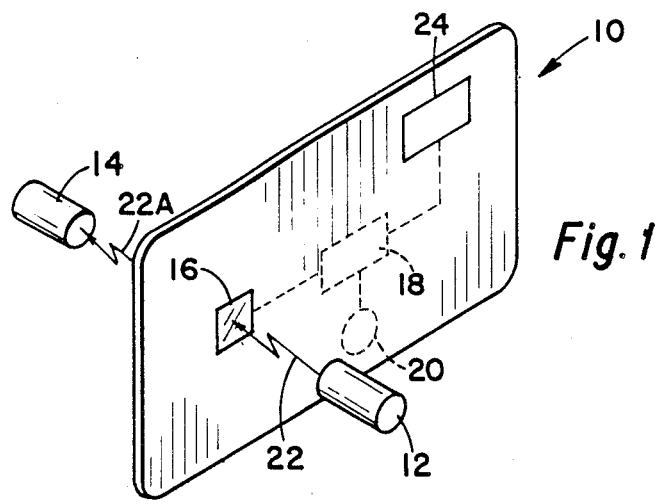
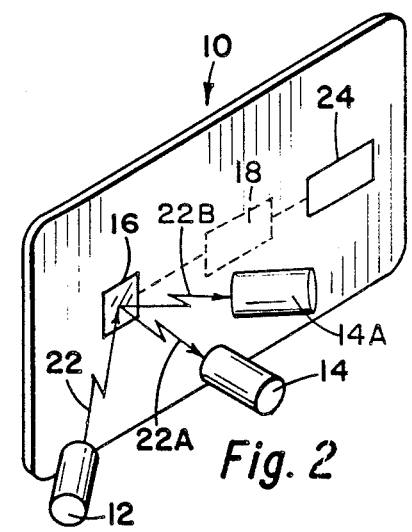
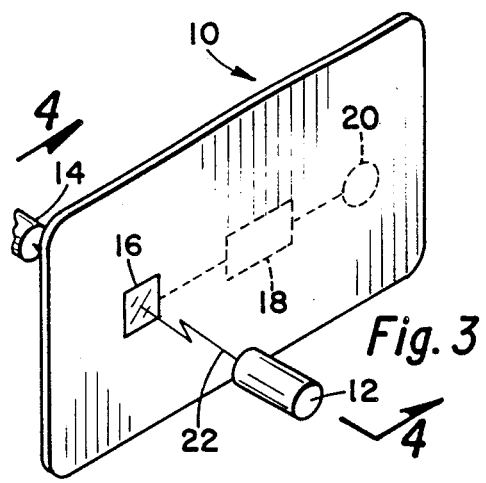
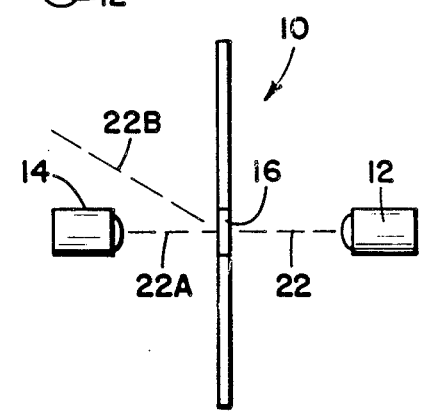
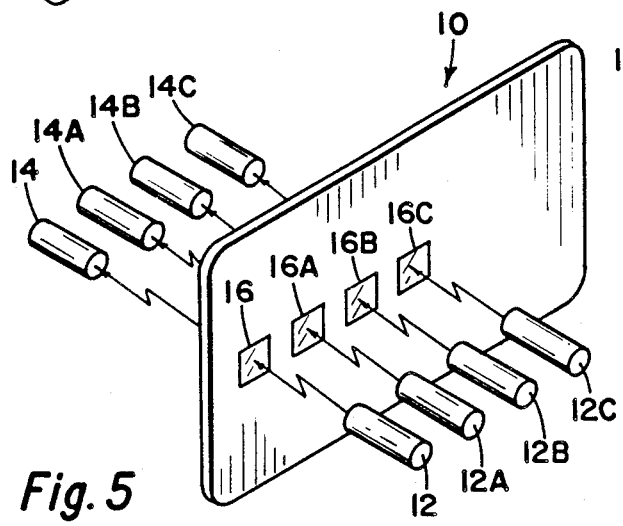

OPTICALLY COUPLED INTERFACE FOR PORTABLE SEMI-CONDUCTOR DATA MEDIA

SUMMARY OF THE INVENTION

As semi-conductor memories become more dense and operate on less power, they are beginning to be used as a non-volatile memory storage in compact form that can easily be transported from one host device to another. As an example there already are in use credit-card size modules which contain CMOS memory, powered by a battery which is also self-contained on or in the module. These modules have a connector along one edge which allow data to be passed between the module and a host device into which it is plugged. A problem which exists with such arrangement is the use of a connector to pass the data. Since the modules are primarily adapted for repeated use, the frequent plugging into and removing of the modules from a host device results in rapid wear of the connectors. When connectors become worn there is a high risk of erratic operation.

The present invention is directed towards providing an interface for a portable semi-conductor data media. The interface being typically in the form of a flat, usually rectangular member adaptable to be carried in the shirt pocket, wallet or purse of the user. The portable module provides a method of passing data which does not rely on mechanical contact and which requires minimum power which may be supplied by a self-contained battery and/or photoelectric cells.

The module has an optically responsive window adapted to receive optical data initializing signals from the host device. Self-contained within the module is a means for controlling the optically responsive window to impart data onto optical signals which are received by the host device.

In one practical application of the invention, the module is the size of a typical credit card and perhaps differing only in slightly increased thickness. The module has an optical window. The host device has a light transmitting element which functions to provide an optical data initiating signal. When inserted into the host the module window is aligned to receive light from the host light source. The light impinges on the window and the window is responsive to alter the light beam as it leaves the window, either as it passes through the window or is reflected off the window, to impart a digital signal. In one embodiment the host device has a photosensitive receiver which receives light passing through the window in the module. The window includes means of controlling the quantity of light passing through, that is, has means to produce a shutter effect in the window. The light receiver thus functions to provide a signal indicative of data transmitted from the module to the host device.

In another embodiment the window is of controllable reflectivity and the host device includes a light sensitive element which receives light reflected from the window. By controlling the reflected light a signal is obtained from the light receiver in response to the degree of reflectivity of the window.

In still a third embodiment of the invention the window in the module is controllable to vary the deflection of light so that the light is deflected onto or away from an optically sensitive element to thereby impart a signal in the optically sensitive element.

In a different embodiment, a plurality of such optically responsive windows are employed for simultaneous individual receipt of optical data initiating signals from the host device and for controlling the transfer of data from the module to the host device by individually controlling the effect of light on a photosensitive device paired with each window.

The module contains solid state circuitry components in the form of ROMS or RAMS or a combination of both. When RAMS are employed a self-contained battery is utilized as a part of the module. In another embodiment the module may include a photovoltaic cell positioned to receive light from the host device which is separate and distinguished from the light utilized for providing optical data initiating signals. The photovoltaic device can thus provide voltage for use in controlling the optical characteristics of the window in response to the self-contained solid state circuitry.

A better understanding of the invention will be had by reference to the following description and claims, taken in conjunction with the attached drawings.

DESCRIPTION OF THE DRAWINGS

FIG. 1 is a diagrammatic view of a portable module in the shape of a credit card for use with a host device wherein only the optical data initiating signal element and the optical data receiving element of the host device are shown.

FIG. 2 shows an alternate embodiment of the invention wherein the window of the module is of variable reflectivity or variably deflective.

FIG. 3 shows an alternate embodiment in which the window of the module varies the deflection of an optical signal.

FIG. 4 is a cross-sectional view taken along the line 4—4 of FIG. 3 showing the manner in which the controllable deflective characteristics of the window in the module are utilized to convey signals to the host device.

FIG. 5 is an additional alternate embodiment wherein the module includes a plurality of windows separately responsive to optically control signals in the host device.

DESCRIPTION OF THE PREFERRED EMBODIMENTS

Referring to the drawing and first to FIG. 1, an optically coupled data interface is shown. The interface occurs between a module generally indicated by the numeral 10 which preferably is in the form of a relatively thin, flat element of dimensions for convenient use such as to be carried in the shirt pocket, billfold or purse of the user. In the arrangement illustrated in FIG. 1 the module 10 is in the general shape of a credit card and may be slightly thicker than the typical plastic card in use at the present time which serves to convey only physically imprinted information or magnetically encoded information.

The module 10 is used in an interface relationship with the host device wherein the host device is exemplified by a light transmitting element 12 which functions as a means to impart optical data initiating signals. The other element of the host device illustrated is a light sensitive receiving element 14.

Formed in the module 10 is an optically responsive window 16. The optically controllable window as will be described in more detail subsequently, is an element which responds to convey data by altering the effect of a light beam directed onto the window by the light transmitting element 12 and may be in the form of a controllable optical shutter, a controllable optical reflector, or a controllable optical deflector.

Window 16 is controlled by electrical signals from solid state circuitry 18 which typically includes read only memories (ROMS) but which in some applications may employ random access memories (RAMS). A voltage source in the form of a self-contained battery 20 is provided.

In the embodiment of FIG. 1 the window 16 functions as an optical shutter. When the module 10 is inserted into the host device a light beam 22 is discharged by the light transmitter 10 onto window 16. A portion of the light beam 20 passes through window 16 as indicated by the numeral 22A and strikes the light receiving element 14. The optical window 16 varies the amount of light passing through, that is, functions as a shutter to either substantially let the light pass through or substantially close the passage of light. The difference in modes being that which is sufficient to provide a high or low electrical output from element 14 or a digital one or zero signal.

FIG. 5 shows an alternate embodiment of FIG. 1 in which there are four windows indicated as 16, 16A, 16B and 16C working in conjunction with four light transmitting elements 12, 12A, 12B, and 12C and four light receiving elements 14, 14A, 14B, and 14C. In this manner four digital signals can be transmitted through the interface concurrently. The use of four windows, four light transmitting elements and four light receiving elements is only emblemmatic of the use of a plurality of such elements and obviously 1, 2 or any greater number of light transmitting, light receiving and window elements may be employed.

FIG. 2 shows an alternate means of practicing the invention in which the window 16 is of the type providing controllable light reflective characteristics. The light transmitting element 12 and the light receiving element 14 are positioned on the same side of the module. Window 16 receives light beam 22 from light transmitting element 12 and reflects light beam 22A onto the light receiving element 14. By controlling the relative reflectivity of window 16, with a light beam 22 of level intensity, a digital signal can be transmitted to the light receiving element 14.

Another arrangement utilizes controlled deflection of light beam 22. When the light receiving element is actuated light beam 22 is deflected at 22B to impinge, or not impinge, upon light receiving element 14A. By controlling the angle of deflection of the light beam 22B a digital signal can be transmitted to light receiving element 14A.

FIG. 3 and 4 show a still different embodiment of the invention in which the light transmitting element 12 and the light receiving element 14 are on opposite sides of the module 10, as shown in FIG. 1 but wherein the window 16 functions to vary the deflection of the light beam. As shown in the cross-sectional view of FIG. 4, the light beam 22 when allowed to pass directly through window 16 engages the light receiving element 14 but when the window 16 is electrically controlled to deflect the light beam such as illustrated by 22B in FIG. 4, the light beam does not impinge upon the light receiving element 14. Thus, by controlling the deflection of the light beam a digital signal may be interfaced between the module 10 and the host device.

Energy to control window 16 in response to circuitry 18 is, as previously indicated, supplied by battery 20. An alternate means illustrated in FIG. 2 employs the use of a photovoltaic element 24 on the module. When the module is inserted into the host device, a separate light source, which may be a part of beam 20 or may be supplied by a separate light beam from a separate light source impinges upon the photovoltaic element 24 to generate voltage required by circuitry 18 and window 16. By the use of such photovoltaic device the window 16 can be controlled to provide additional signals in response to ROMS forming a portion of circuitry 18 without the module requiring a sustained electrical voltage source. When the module is required to employ an electrical voltage sufficiently to maintain data in memory in RAMS, the use of a battery 20 is required. However, since substantially less voltage is required to maintain the status of RAMS than to operate a device, even a low current device such as window 16, nevertheless, this energy may be supplied by a photovoltaic element 24 when the module is in active use for interfacing data with a host device. Thus, in FIG. 1 both a battery 20 and a photovoltaic element 24 may be employed.

The invention described provides a unique and highly portable module which may be of any desired shape but which typically can be in the shape such as a typical credit card, for use with a host device wherein an interface is achieved between the module and the host device without the necessity of having physical connectors. It can be seen that in the invention described there is nothing to physically wear in moving the card into and out of an interface relationship with a host device so that the life expectancy of the module is substantially improved over apparatus requiring physical conductive contact between the module and the host. In addition, since physical contact is not employed the possibility of erroneous erratic interface data transfer is greatly minimized.

The window 16 may be of the liquid crystal display type or other solid state type devices for controlling the passage of light therethrough. For instance, when the window 16 is formed of a plurality of LCD's closely spaced and with the LCD's OFF, the window will be substantially reflective, but with the LCD's ON the window becomes optically black so that substantially less light is reflected as would be employed in the embodiment of FIG. 2. Other similar arrangements can be employed for practicing the mode of the invention illustrated in FIGS. 1 and 3.

The term "light", as used herein means electromagnetic radiation, either in the visible or invisible spectrums. The term "optical shutter" includes any device which can be controlled such that it can alternately interrupt or not interrupt the flow of light from the light emitter to a light detector by either blocking or attenuating the light or bending its path. In transmitting data the window 16 functions, as has been previously indicated, to convey data in a binary coded format such as ON or OFF, high or low, or one or zero relationship.

While the invention has been described with a certain degree of particularity it is manifest that many changes may be made in the details of construction and the arrangement of components without departing from the spirit and scope of the this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An optically coupled data interface comprising:
   a host device having means to receive data in optical format and having means to impart optical data initiating signals;
   a portable module having means to optically interface with said host device and having an optically responsive window (adapted to receive) for receiving optical (data initiating) signals from said host device; and
   means self contained in said portable module for controlling said optically responsive window to impart data onto optical signals receivable by said host device.

2. An optically coupled data interface according to claim 1 wherein said module is in the form of thin, relatively flat a member adaptable for convenient on-person carriage such as in the pocket, billfold or purse of a user.

3. An optically coupled data interface according to claim 1 wherein said optically responsive window is in the form of a controllable optical shutter.

4. An optically coupled data interface according to claim 1 wherein said optically responsive window is in the form of a controllable optical reflector.

5. An optically coupled device according to claim 1 wherein said optically responsive window is in the form of a controllable optical deflector.

6. An optically coupled device according to claim 1 wherein said optically responsive window is in the form of a plurality of windows each adapted to sumultaneously receive optical data initiating signals from said host device and for individually imparting data onto optical signals receivable by said host device.

7. An optically coupled data interface according to claim 1 wherein said module contains a photovoltaic element adaptable to receive light from said host device when said module and host device are interfaced, said photovoltaic element providing electrical energy for operation of said optically responsive window.

* * * * *